United States Patent [19]

Thomas et al.

[11] Patent Number: 4,798,707

[45] Date of Patent: Jan. 17, 1989

[54] SAIL BOAT CHLORINE DISPENSER

[76] Inventors: Barry G. Thomas, 2308 E El Parque Dr., Tempe, Ariz. 85282; George Spector, 233 Broadway, Rm 3815, New York, N.Y. 10007

[21] Appl. No.: 36,387

[22] Filed: Apr. 9, 1987

[51] Int. Cl.⁴ .............................................. B01F 1/00
[52] U.S. Cl. .................................... 422/264; 422/265; 137/268; 210/169; 222/168; 222/169; 222/172
[58] Field of Search .............. D23/3, 4; 422/264, 265, 422/266, 267; 222/168, 169, 172; 210/169, 205, 220, 242.1; 137/268

[56] References Cited

U.S. PATENT DOCUMENTS

| Des. 252,337 | 7/1979 | Hehnen | D23/3 |
| Des. 256,498 | 8/1980 | Kennedy | D23/3 |
| 4,630,634 | 12/1986 | Sasaki et al. | 422/265 |
| 4,643,881 | 2/1987 | Alexander et al. | 210/169 |

Primary Examiner—Barry S. Richman
Assistant Examiner—Timothy M. McMahon

[57] ABSTRACT

A sailboat chlorine dispenser is provided which will dispense chlorine more evenly due to its shape as a sailboat wherein wind will help move the dispenser around water in a pool. In a modification a sleeve containing the chlorine is rotated and activated by water movement in the pool.

2 Claims, 1 Drawing Sheet

SAIL BOAT CHLORINE DISPENSER

BACKGROUND OF THE INVENTION

The instant invention relates generally to dispensing devices and more specifically it relates to a sailboat chlorine dispenser for a swimming pool.

Numerous dispensing devices have been provided in prior art that are adapted to distribute chlorine and other chemicals into swimming pools. For example, U.S. Pats. No. 3,202,322; 3,677,711 and 4,546,503 all are illustrative of such prior art. While these units may be suitable for the particular purpose to which they address, they would not be as suitable for the purposes of the present invention as heretofore described.

SUMMARY OF THE INVENTION

A primary object of the present invention is to provide a sailboat chlorine dispenser that will overcome the shortcomings of the prior art devices.

Another object is to provide a sailboat chlorine dispenser that will dispense chlorine more evenly due to its shape as a sailboat wherein wind will help move the dispenser around water in a pool.

An additional object is to provide a sailboat chlorine dispenser that will dispense chlorine more quickly due to the sleeve containing the chlorine rotated and activated by water movement in a pool.

A further object is to provide a sailboat chlorine dispenser that is simple and easy to use.

A still further object is to provide a sailboat chlorine dispenser that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
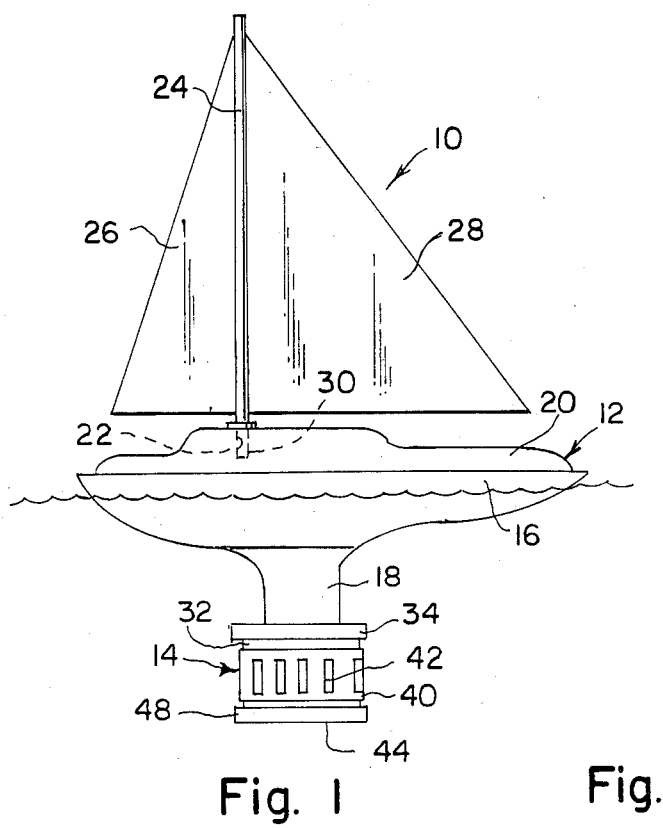
FIG. 1 is a side elevational view of the invention.

Turning now descriptively to the drawings, in which similar reference characters denote similar elements throughout the several views, FIG. 1 illustrates a sailboat chlorine dispenser 10 consisting of a flotation member 12 being in the shape of a sailboat. A perforated hollow container 14 is affixed to lowest portion of the flotation member 12 to dispense chlorine therefrom into water in a pool.

The sailboat flotation member 12 includes a hollow hull 16 having a flat keel 18 extending downwardly therefrom. A deck 20 that has a small hole 22 therein is affixed to top of the hollow hull 16. A mast 24 is provided that has a foresail 26 and a mainsail 28. Bottom end 30 of the mast 24 fits within the small hole 22 in the deck 20 so that wind will help move the dispenser 10 around the water in the pool.

Figure 2:
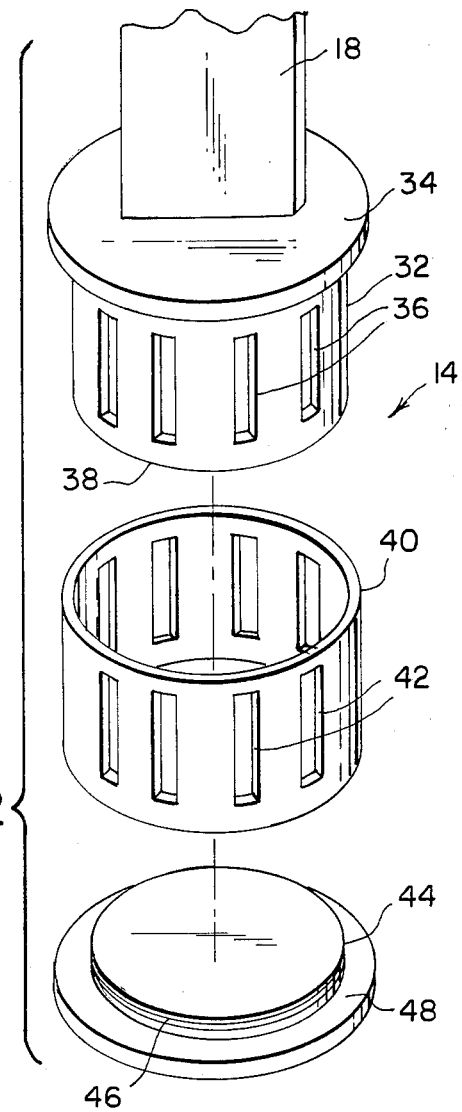
FIG. 2 is an exploded perspective view of the chlorine dispenser portion of the invention.

As best seen in FIG. 2 the perforated hollow container 14 includes a cylindrical hollow housing 32 that has an upper flange 34, a plurality of first vertical rectangular apertures 36 therethrough and an open bottom end 38 with internal threads (not shown). The housing 32 holds the chlorine therein and is affixed at the upper flange 34 to end of the flat keel 18 of the hollow hull 16. A hollow cylindrical sleeve 40 is provided that has a plurality of second vertical rectangular apertures 42 therethrough. The sleeve 40 is of a size to fit onto the housing 32 and be manually turned thereon to control amount of chlorine to exit the first and second vertical rectangular apertures 36 and 42. A cap 44 that has external threads 46 and a lower flange 48 is removably screwed into the bottom end 38 of the housing 32 so that the lower flange 48 will hold the sleeve 40 thereto while sealing the bottom end 38 of the housing 32.

Figure 4:
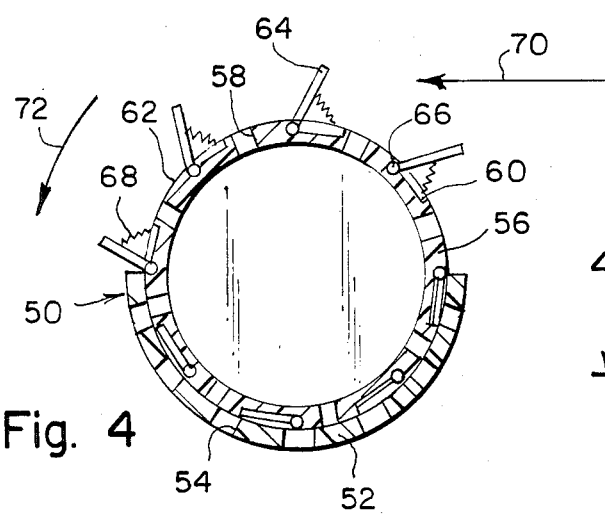
FIG. 4 is a cross sectional view taken along line 4—4 in FIG. 3 showing a rotating sleeve activated by spring biased pivotal fins.
Figure 3:
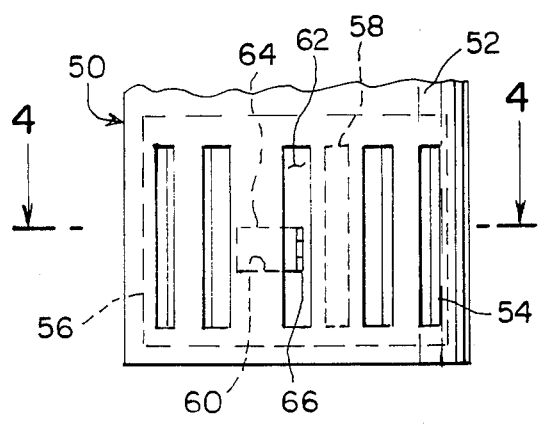
FIG. 3 is a side elevational view of a modified chlorine dispenser portion.

FIGS. 3 and 4 show a modified perfromated hollow container 50 that includes a hemi-cylindrical hollow housing 52 that has a plurality of first vertical slots 54 therethrough. The housing 52 is affixed at upper end (not shown) to the flat keel 18 of the hollow hull 16. A rotating hollow sleeve 56 has a plurality of second vertical slots 58 therethrough and a plurality of recesses 60 in outer circumference 62 therebetween. The sleeve 56 hold the chlorine therein and is of a size to fit into the housing 52. A plurality of fins 64 are provided. Each of the fins 64 is pivotable at 66 in one of the recesses 60 in the sleeve 56. The fins 64 are spring biased at 68 to fan outwardly therefrom so as to catch water movement as indicated by arrow 70 in FIG. 4 in a pool to rotate the sleeve 56 as indicated by arrow 72 in FIG. 4 until the fins 64 are pushed backward into the recesses 60 by the housing 52 thus to quickly dispense the chlorine from the sleeve 56.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A chlorine dispenser comprising a sailboat in combination with dispensing means secured to said sailboat, said dispensing means comprising means responsive to sailboat movement through a fluid to adjust the rate of dispensing chlorine to predetermined areas of said dispenser, said means responsive to sailboat movement comprising:

(a) a partial cylindrical hollow housing with spaced longitudinal ends having a plurality of first vertical slots between said ends;

(b) a hollow sleeve mounted in said housing and rotatable therein and having a plurality of second vertical slots therethrough and a plurality of recesses on an outer peripheral surface therebetween whereby said recesses hold the chlorine therein; and (c) a plurality of fins, each of said fins pivotable in one of said recesses in said sleeve, said fins spring biased to fan outwardly therefrom so as to catch water movement in a pool to rotate said sleeve until said fins are pushed backward into said recesses by said housing whereby chlorine is dispensed from said recesses when each fin is clear of said housing permitting outward pivotal fin movement.

2. A sailboat chlorine dispenser comprising:
(a) a floatation member being in the shape of a sailboat;
(b) a perforated hollow container affixed to lowest portion of said floatation member to dispense chlorine therefrom into water in a pool, wherein said sailboat floatation member includes:
(c) a hull having a flat keel extending downwardly therefrom;
(d) a mast having a foresail and mainsail mounted thereon, said perforated hollow container includes:
(e) a partial cylindrical hollow housing with spaced longitudinal ends having a plurality of first vertical slots between said ends, said housing being affixed at an upper end to said flat keel, providing an unobstructed lateral opening between said keel and said spaced ends;
(f) a hollow sleeve and munted in said housing and rotatable therein whereby said recesses hold the chlorine therein; and
(g) a plurality of fins, each of said fins pivotable in one of said recesses in said sleeve, said fins spring biased to fan outwardly therefrom so as to catch water movement in a pool to rotate said sleeve until said fins are pushed backward into said recesses by said housing whereby chlorine is dispensed from said recesses when each fin is clear of said housing permitting outward pivotal fin movement.

* * * * *